United States Patent
Cha et al.

(10) Patent No.: US 8,228,422 B2
(45) Date of Patent: Jul. 24, 2012

(54) SYSTEM AND METHOD FOR AUTOMATIC EXPOSURE

(75) Inventors: Joon Hyuk Cha, Incheon-si (KR); Young Su Moon, Seoul (KR); Sang Jo Lee, Suwon-si (KR); Ho Jin Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 642 days.

(21) Appl. No.: 12/382,818

(22) Filed: Mar. 24, 2009

(65) Prior Publication Data

US 2010/0091176 A1 Apr. 15, 2010

(30) Foreign Application Priority Data

Oct. 9, 2008 (KR) .................. 10-2008-099091

(51) Int. Cl.
  *H04N 5/243* (2006.01)
  *G03B 7/091* (2006.01)
(52) U.S. Cl. ............ 348/365; 348/221.1; 396/213
(58) Field of Classification Search .......... 396/213; 348/221.1, 365
  See application file for complete search history.

(56) References Cited

U.S. PATENT DOCUMENTS

| 6,900,840 B1* | 5/2005 | Schinner et al. | 348/333.01 |
| 2007/0177050 A1* | 8/2007 | Xiao et al. | 348/371 |

FOREIGN PATENT DOCUMENTS

| KR | 10-2005-0103842 | 11/2005 |
| KR | 10-2006-0004252 | 1/2006 |
| KR | 10-2007-0053288 | 5/2007 |
| KR | 10-2007-0078810 | 8/2007 |
| KR | 10-2008-0059462 | 6/2008 |

* cited by examiner

*Primary Examiner* — Clayton E Laballe
*Assistant Examiner* — Leon W Rhodes, Jr.
(74) *Attorney, Agent, or Firm* — Staas & Halsey LLP

(57) ABSTRACT

Disclosed are an auto exposure system and a method thereof. The auto exposure system may check whether an exposure target value is correct using brightness information of an input image. When the exposure target value is not proper, the auto exposure system may readjust the exposure target value through analyzing the brightness information of the input image. Also, the auto exposure system may correct exposure of the input image based on an exposure correction value according to the adjusted exposure target value, thereby adjusting the exposure of the input image to be proper. Also, exposure information of the input image may be easily obtained from a final exposure target value.

20 Claims, 9 Drawing Sheets

SYSTEM AND METHOD FOR AUTOMATIC EXPOSURE

CROSS-REFERENCE TO RELATED APPLICATION

This application claims the benefit of Korean Patent Application No. 10-2008-0099091, filed on Oct. 9, 2008, in the Korean Intellectual Property Office, the disclosure of which is incorporated herein by reference.

BACKGROUND

1. Field

Example embodiments relate to an auto exposure system, and more particularly, to an auto exposure system that may maximally utilize a dynamic range of an image device and promptly perform an auto exposure process through setting a variable exposure target value.

2. Description of the Related Art

A correction process of exposure of an input image with respect to an image device such as a digital camera, digital camcorder, and the like is important. Exposure of the image device may be adjusted to enable a brightness value of an image to correspond to a predetermined target value. However, according to this method, a portion of an image may be saturated due to an overexposure, and thereby there may be difficulty in restoring details of the image.

Also, according to the method, when a target value is incorrectly determined, correcting of the incorrect target value may be repeatedly performed, and thus, it may take significant time for completing the auto exposure.

Accordingly, a method that may prevent saturation of an input image through limiting maximum brightness of the input image and also effectively perform auto exposure is required.

SUMMARY

According to example embodiments, there may, but not necessarily, be provided an auto exposure system, the system including an exposure feature value extractor to extract an exposure feature value using a brightness value of an input image, an exposure correction determination unit to determine whether an exposure correction with respect to the input image is necessary by comparing the exposure feature value with an exposure target value, an exposure target value adjusting unit to adjust the exposure target value based on the brightness value of the input image, when the exposure correction is necessary, and an auto exposure unit to calculate an exposure correction value of the exposure feature value based on the adjusted exposure target value, and to perform auto exposure according to the exposure correction value.

In an aspect of the example embodiments, the exposure target value adjusting unit includes a proper exposure condition determination unit to determine whether an upper area distribution of a brightness histogram with respect to the input image satisfies proper exposure conditions including a first exposure condition which determines an overexposure and a second exposure condition which determines an underexposure and an exposure target value readjustment unit to readjust the exposure target value based on a result of the determining whether the upper area distribution of a brightness histogram with respect to the input image satisfies the proper exposure conditions.

In an aspect of example embodiments, the auto exposure system may further include an oscillation determination unit to determine whether oscillation of the exposure correction value occurs according to changes of the exposure correction value, when the auto exposure of the input image is performed.

According to example embodiments, there may, but not necessarily, be provided a method for auto exposure, the method including extracting an exposure feature value of an input image using a brightness value of the input image, determining whether exposure correction with respect to the input image is necessary including comparing the exposure feature value with an exposure target value, adjusting the exposure target value based on the brightness value of the input image, when the exposure correction is necessary, and calculating an exposure correction value of the exposure feature value based on the adjusted exposure target value and performing auto exposure according to the exposure correction value. Also, when the auto exposure is completed, exposure information of an input image may be easily obtained from the exposure target value.

Additional aspects, of example embodiments will be set forth in part in the description which follows and, in part, will be apparent from the description, or may be learned by practice of the disclosure.

BRIEF DESCRIPTION OF THE DRAWINGS

These and/or other aspects of example embodiments will become apparent and more readily appreciated from the following description, taken in conjunction with the accompanying drawings of which.

DETAILED DESCRIPTION

Reference will now be made in detail to example embodiments, examples of which are illustrated in the accompanying drawings, wherein like reference numerals refer to the like elements throughout. Example embodiments are described below to explain the present disclosure by referring to the figures.

Figure 1:
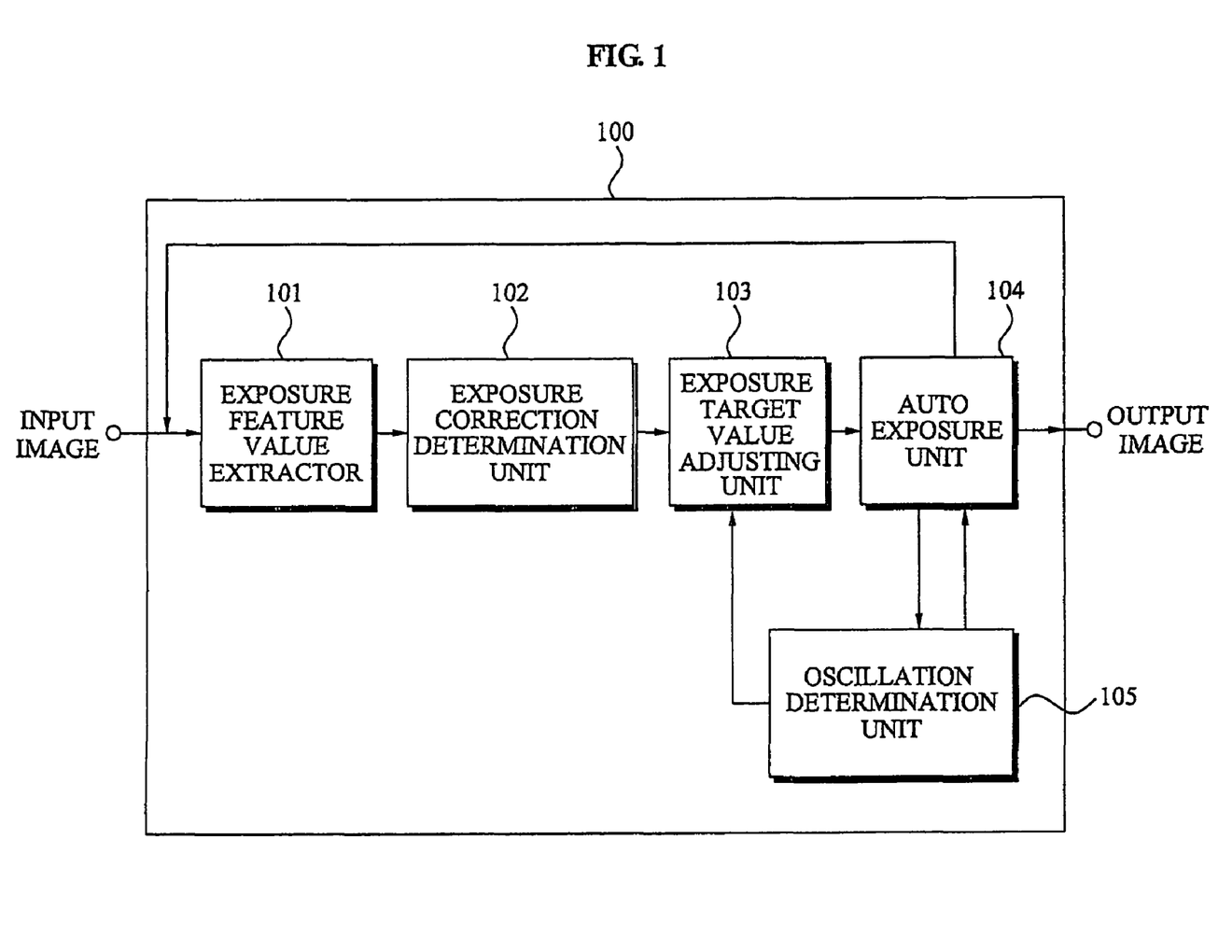
FIG. 1 is a block diagram illustrating a configuration of an auto exposure system according to an example embodiment.

FIG. 1 is a block diagram illustrating a configuration of an auto exposure system according to an example embodiment.

Referring to FIG. 1, the auto exposure system 100 may include an exposure feature value extractor 101, exposure correction determination unit 102, exposure target value adjusting unit 103, an auto exposure unit 104, and an oscillation determination unit 105.

Figure 2A:
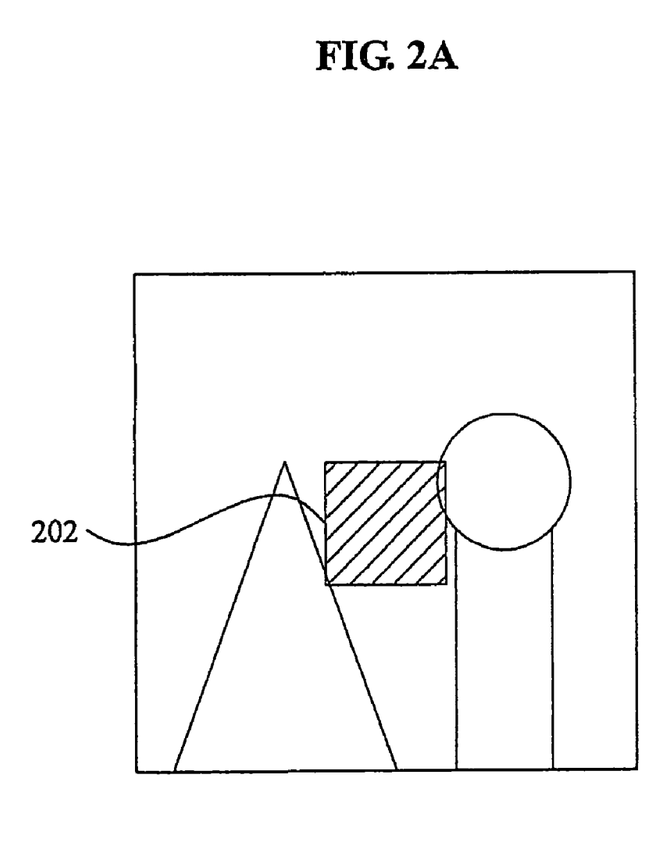
FIGS. 2A and 2B illustrate examples of extracting an exposure feature value of an input image according to an example embodiment.
Figure 2B:
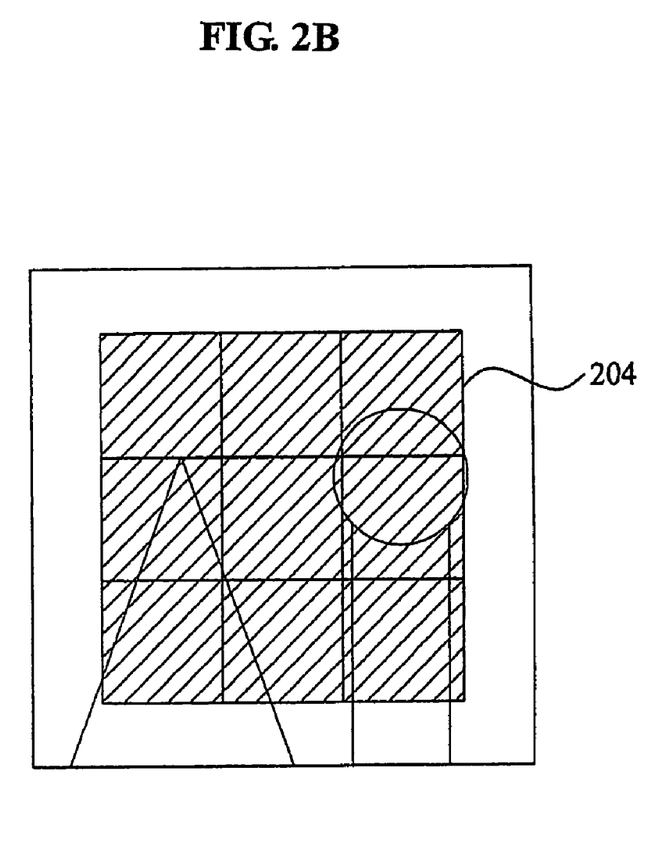

The exposure feature value extractor 101 may extract an exposure feature value of an input image using a brightness value of the input image. As an example, the exposure feature extractor 101 may extract from either an average brightness value or intermediate brightness value of the input image, which is the exposure feature value, using a brightness value of an entire region or a brightness value of a partial region of the input image. A process using the brightness value of the partial region will be described in detail with reference to FIG. 2. In this instance, the exposure feature value extractor 101 may extract the average brightness value or intermediate brightness value of the input image using a brightness histogram of the input image.

The exposure correction determination unit 102 may determine whether exposure correction is necessary with respect to the input image through comparing the exposure feature value with an exposure target value. For example, the exposure correction determination unit 102 may determine whether the exposure correction is necessary based on whether the exposure feature value is in an error range of the exposure target value. In this instance, the exposure target value indicates an exposure feature value which enables the brightness of the input image to be optimum. The set exposure target value may vary, depending on a configuration of a system.

When the exposure feature value is in the error range of the exposure target value, the exposure correction determination unit 102 may determine that the input image is in a proper exposure state, thereby performing auto exposure with respect to the input image.

A process in which the exposure correction determination unit 102 determines whether the exposure correction with respect to the input image is necessary will be described with reference to FIG. 3.

When the exposure correction determination unit 102 determines that exposure correction with respect to the input image is necessary, the exposure target value adjusting unit 103 may adjust the exposure target value based on brightness information of the input image. As an example, the exposure target value adjusting unit 103 may include a proper exposure condition determination unit which determines whether an upper area distribution of a brightness histogram with respect to the input image satisfies proper exposure conditions including a first exposure condition determining an overexposure and a second exposure condition determining an underexposure.

An operation of the proper exposure condition determination unit will be described with reference to FIG. 4.

Also, the exposure target value adjusting unit 103 may include an exposure target value readjustment unit to readjust the exposure target value based on a result of determination with respect to the proper exposure conditions. In this instance, the exposure target value readjustment unit may maintain a predetermined exposure target value or readjust the exposure target value to a new exposure target value which is increased or decreased according to the result of determination with respect to the proper exposure conditions.

As an example, the exposure target value readjustment unit may readjust the exposure target value according to a general correction mode or fine correction mode. The general correction mode is a setting mode of the exposure target value, which increases or decreases the exposure target value according to a predetermined adjustment value with respect to the exposure target value. Also, the fine correction mode is a setting mode of the exposure target value, which finely increases or decreases the exposure target value according to an adjustment value smaller than the predetermined adjustment value. An operation of the exposure target value will be described in detail with reference to FIGS. 5 to 7.

The auto exposure unit 104 may calculate an exposure correction value of the exposure feature value based on an adjusted exposure target value, and perform auto exposure according to the exposure correction value. In this instance, the exposure feature value is adjusted to be the exposure target value, thereby performing auto exposure of the input image.

In this instance, when the exposure correction value is zero, the auto exposure unit 104 may complete the auto exposure and increase the error range of the exposure target value. That is, the auto exposure unit 104 may increase the error range of the exposure target value not to excessively react to a slight exposure change.

Also, when the exposure correction value is not zero, the auto exposure unit 104 may perform auto exposure of the input image using an exposure correction value according to a ratio of the exposure target value to the exposure feature value. For instance, the exposure correction value may be calculated according to a ratio of the exposure feature value to the exposure target value. For example, when the exposure target value is two times the exposure feature value, exposure amount of the input image may be increased to be double. Also, when the exposure target value is half the exposure feature value, exposure amount of the input image may be decreased to be half. In this instance, a process of calculating the exposure correction value is a process of calculating a ratio of a new exposure to a present exposure.

In the case of a camera, exposure information may be adjusted according to camera settings, such as an exposure time (shutter speed), sensor sensitivity (ISO), and an aperture. When the exposure correction value doubles, the auto exposure system may double the exposure time, double the sensor sensitivity (ISO), or increase the iris diaphragm level by 1 EV times, and thus the exposure feature value is adjusted to be the exposure target value. The process of performing the auto exposure may be performed at least once, except when the exposure correction value is unnecessary. When the auto exposure is completed, an entire process with respect to the input image may be repeatedly performed. Next, when the exposure correction value is determined as unnecessary, the auto exposure process may be finished.

When auto exposure of the input image is performed, the oscillation determination unit 105 may determine whether oscillation of the exposure correction value occurs according to changes of the exposure correction value. For example, when there is a plurality of pixels having the same brightness, the auto exposure may be oscillating as opposed to being convergent.

As an example, when the exposure correction value is determined as oscillating and a setting mode of the exposure target value is a general correction mode, the oscillation determination unit 105 may convert the setting mode to a fine correction mode. Also, when the exposure correction value is determined as oscillating and the setting mode of the exposure target value is a fine correction mode, the oscillation determination unit 105 may complete the auto exposure of the input image. Accordingly, the oscillation determination unit 105 may determine whether the exposure correction value is oscillating, thereby controlling readjusting of the exposure target value or controlling the auto exposure process.

An operation of the oscillation determination unit 105 will be described in detail later with reference to FIG. 8.

FIGS. 2A and 2B illustrate examples of extracting an exposure feature value of an input image according to an example embodiment.

The exposure feature value extractor 101 may extract the exposure feature value of the input image using a brightness value of the input image. In this instance, the exposure feature value may be an average brightness value or intermediate brightness value of the input image. For example, the exposure feature value extractor 101 may extract the exposure feature value using a brightness value of an entire region or a brightness value of a partial region of the input image.

In this instance, the exposure feature extractor 101 may extract the exposure feature value of the input image using a brightness histogram with respect to the entire region and partial region. A horizontal axis of the brightness histogram represents a brightness range (dynamic range) and a vertical axis of the brightness histogram represents a number of pixels corresponding to the dynamic range.

FIG. 2A illustrates a method of determining a brightness value of a partial region of the input image through one region 202. A size of the one region 202 may vary depending on a configuration of a system. The exposure feature value extractor 101 may extract the exposure feature value of the input image through an average brightness value or an intermediate brightness value of the one region 202.

FIG. 2B illustrates a method of determining a brightness value of a partial region of the input image through a plurality of regions 204. When the plurality of regions 204 are used, the exposure feature value extractor 101 may assign a weight to a brightness value of each divided region. In this instance, the exposure feature value extractor may determine the average brightness value of the input image through averaging brightness values weighted for each region.

Figure 3A:
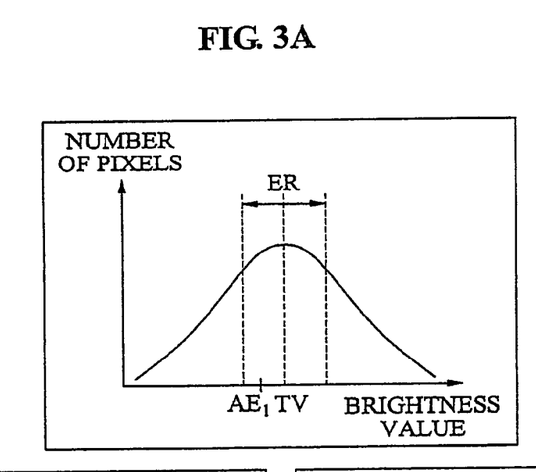
FIGS. 3A-3C illustrate examples of determining whether exposure correction with respect to an input image is necessary according to an example embodiment.
Figure 3B:
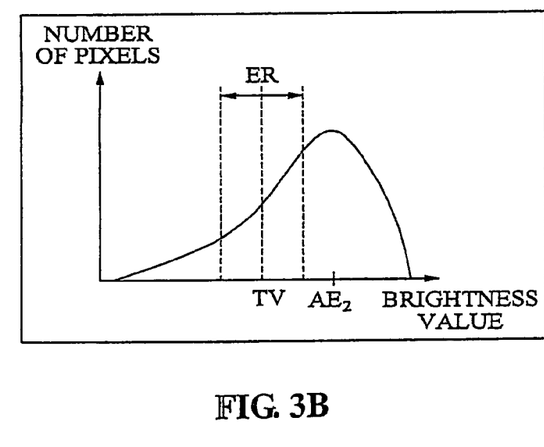
Figure 3C:
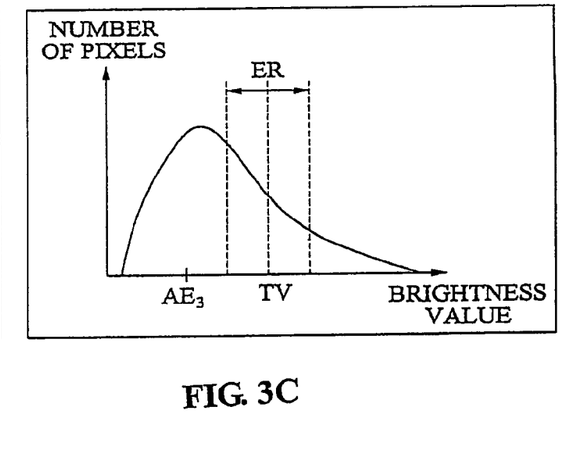

FIGS. 3A-3C illustrate examples of determining whether exposure correction with respect to an input image is necessary according to an example embodiment.

Referring to FIG. 3A a brightness histogram 301 represents the case when the exposure correction of the input image is not necessary. Also, brightness histograms in FIGS. 3B and 3C respectively represent the case when the exposure correction of the input image is necessary. When an exposure feature value ($AE_1$) of the input image exists in an error range of an exposure target value (TV) in the brightness histogram of FIG. 3A, the exposure correction of the input image is unnecessary. The error range may vary according to a configuration of a system.

When exposure feature values ($AE_2$ and $AE_3$) do not exist in the error range of the exposure target value (TV) as illustrated in the brightness histograms in FIGS. 3B and 3C respectively, exposure correction of the input image is unnecessary. The brightness histogram of FIG. 3B represents an overexposure of the input image due to a great number of pixels having a higher brightness value (higher than 128 in the case of an eight bit image), and the brightness histogram of FIG. 3C represents an underexposure of the input image due to a great number of pixels having a lower brightness value (lower than 128 in the case of the eight bit image).

Figure 4A:
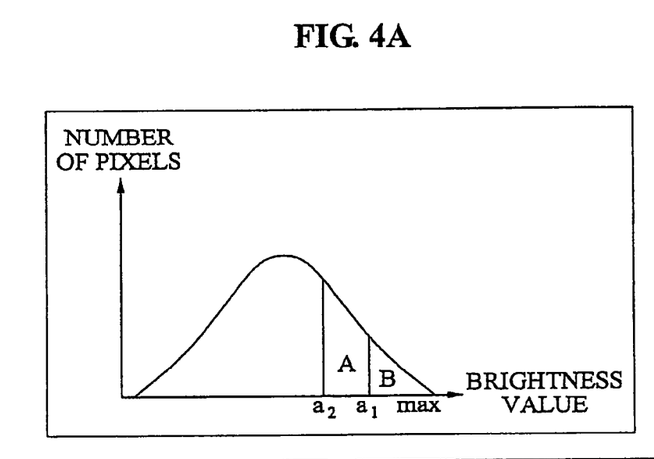
FIGS. 4A-4C illustrate analysis of upper area distribution of brightness histograms according to an example embodiment.
Figure 4B:
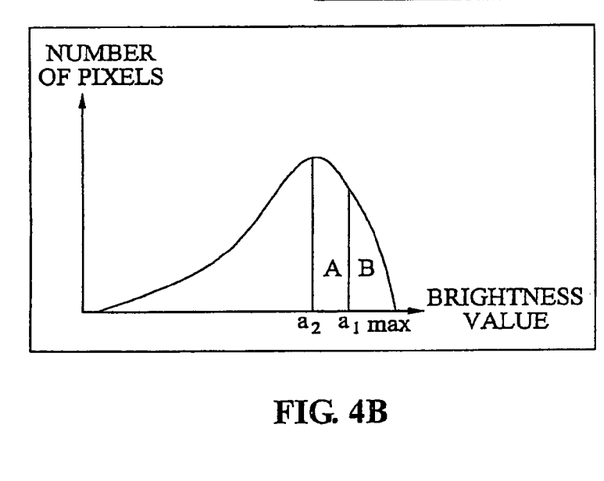
Figure 4C:
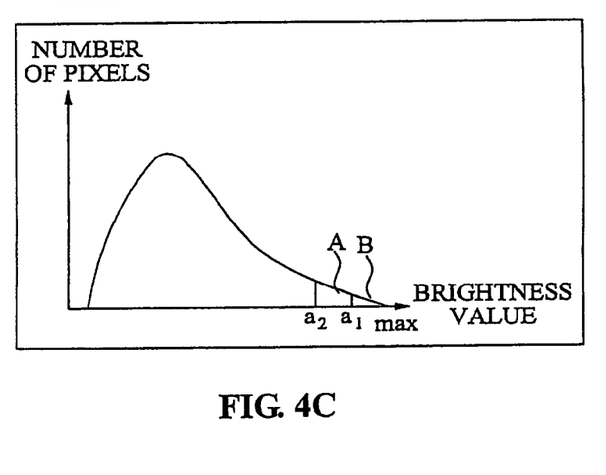

FIGS. 4A-4C illustrate analysis of upper area distribution of brightness histograms according to an example embodiment.

An exposure target value adjusting unit 103 may adjust an exposure target value based on brightness information of an input image. That is, when exposure correction with respect to the input image is necessary, the exposure target value adjusting unit 103 may adjust the exposure target value based on the brightness information of the input image. In this instance, the exposure target value adjusting unit 103 may adjust the exposure target value through analyzing upper area distribution of the brightness histograms of the input image.

As an example, the exposure target value adjusting unit 103 may analyze the upper area distribution of the brightness histograms according to Equation 1 as below.

[Equation 1]

$$\text{Sum\_}H(a_1:\max) < T1 \qquad \text{expression (1)}$$

$$\text{Sum\_}H(a_2:\max) > T2 \qquad \text{expression (2)}$$

Here, $\text{Sum\_}H(a_1:\max)$ indicates a total sum of pixels corresponding to brightness values from $a_1$ to max. $\text{Sum\_}H(a_2:\max)$ indicates a total sum of pixels corresponding to brightness values from $a_2$ to max. In this instance, $a_1$ and $a_2$ represent predetermined brightness reference values in a brightness histogram, which are values greater than an intermediate brightness value (higher than 128 in the case of an eight bit image). Also, T1 and T2 are reference values that are standards for proper exposure.

The exposure target value adjusting unit 103 may determine whether the upper area distribution of the brightness histogram with respect to the input image satisfies proper exposure conditions including a first exposure condition (expression (1) of Equation 1) and second exposure condition (expression (2) of Equation 2). The proper exposure may vary depending on a condition of the input image. For example, the proper exposure is a condition when a highlight region in which brightness of pixels is saturated is minimized and generally the input image is brightened, thereby maximally utilizing a dynamic range.

In this instance, the upper area distribution of the brightness histogram satisfies both the first exposure condition and the second exposure condition, and a present exposure target value may not need readjusting. However, when the upper area distribution of the brightness histogram fails to satisfy the first exposure condition, the input image is determined as an overexposure or including a highlight region, thereby readjusting the present exposure target value. Also, when the upper area distribution of the brightness histogram fails to satisfy the second exposure condition, the input image is determined as an underexposure or being low contrast condition, and thus the present exposure target value may need readjusting.

In the case of a brightness histogram illustrated in FIG. 4A, a region corresponding to expression (1) of Equation 1, which is the first exposure condition, is B. A region corresponding to expression (2) of Equation 2, which is the second exposure condition, is A. That is, when a total number of pixels included in region B is less than T1 and a total number of pixels included in region A is greater than T2, the present exposure target value may not need readjusting. The brightness histograms of FIGS. 4B and 4C may fail to satisfy the first exposure condition or the second exposure condition depending on $a_1$ and $a_2$.

FIGS. 5A-5D illustrate readjusting of an exposure target value (general correction mode) according to an example embodiment.

Figure 5A:
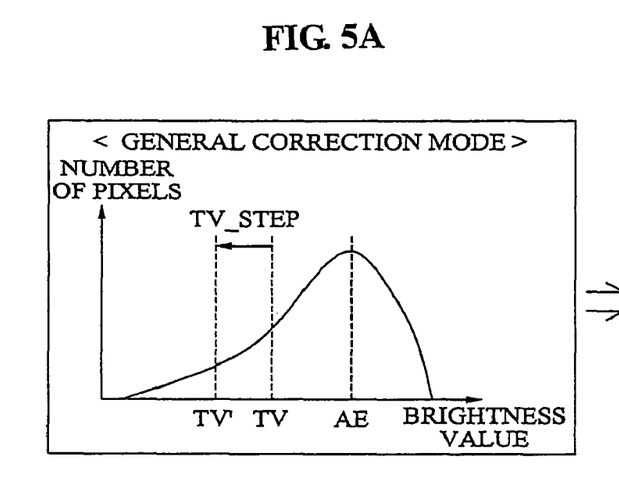
FIGS. 5A-5D illustrate readjusting of an exposure target value (general correction mode) according to an example embodiment.
Figure 5B:
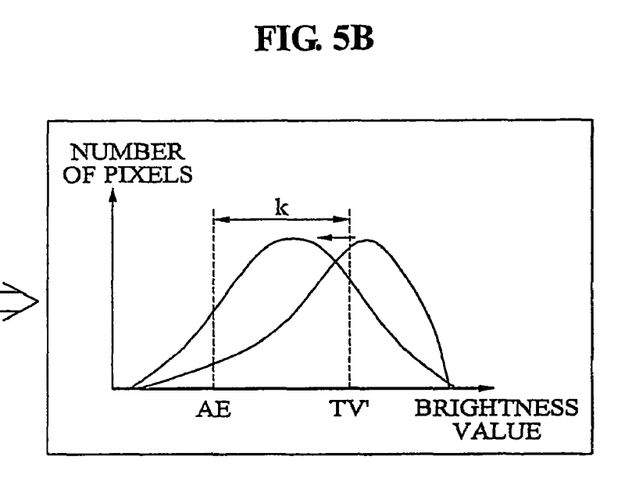

The brightness histogram of FIG. 5A represents the case when expression (1) of Equation 1, which is the first exposure condition, is not satisfied. Also, the brightness histogram 502 represents the case when expression (2) of Equation 1, which is the second exposure condition, is not satisfied.

As an example, when the first exposure condition or the second exposure condition is not satisfied, the exposure target value adjusting unit 103 may adjust a present exposure target value based on Equation 2 as below according to the general correction mode. In this instance, the general correction mode indicates readjusting the present exposure target value according to a predetermined adjustment value.

[Equation 2]

$$TV'=Min(TV, AE)-TV\_STEP \quad \text{expression (3)}$$

$$TV'=MAX(TV, AE)+TV\_STEP \quad \text{expression (4)}$$

Here, expression (3) is used to readjust an exposure target value to reduce exposure of an input image, when the first exposure condition is not satisfied (overexposure). Also, expression (4) is used to readjust an exposure target value to increase exposure of an input image, when the second exposure condition is not satisfied (underexposure). TV indicates a present exposure target value, AE indicates an exposure feature value, TV_STEP indicates the adjustment value. Also, TV' indicates an exposure target value to be readjusted.

Figure 5C:
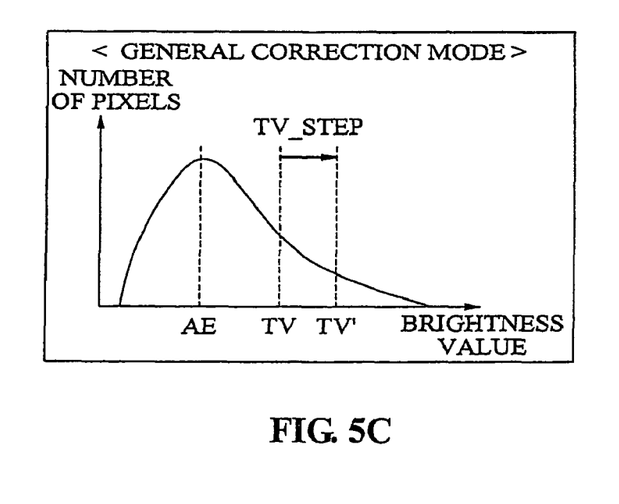
Figure 5D:
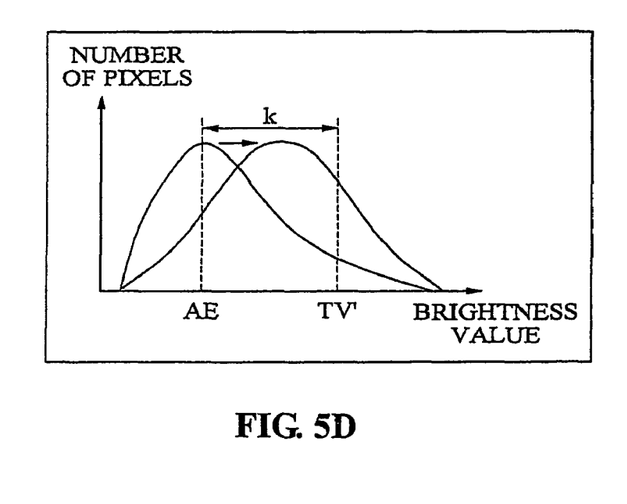

That is, if the brightness histogram of FIG. 5A fails to satisfy the first exposure condition, an exposure target value adjusting unit 103 may readjust the exposure target value (TV) to the exposure target value (TV'). In the same manner, when the brightness histograms of FIGS. 5A and 5C fail to satisfy the second exposure condition, the exposure target value adjusting unit 103 may readjust the exposure target value (TV) to the exposure target value (TV'). Referring to the brightness histograms of FIGS. 5B and 5D, an exposure correction value (K) is determined according to a readjusted exposure target value and the brightness histograms of FIGS. 5A and 5C are adjusted based on the determined exposure correction value, and thus a dynamic range of the input image increases.

Figure 6:
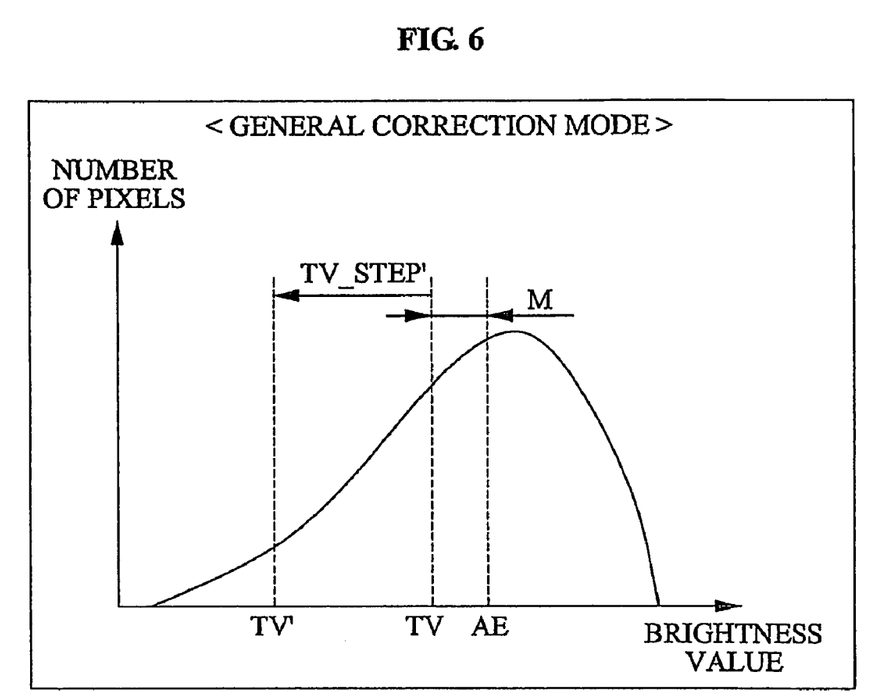
FIG. 6 illustrates readjusting of an exposure target value, when a difference between an exposure target value and exposure feature value is small according to an example embodiment.

FIG. 6 illustrates readjusting of an exposure target value, when a difference between the exposure target value and an exposure feature value is small according to an example embodiment.

FIG. 6 illustrates a unique case of the general correction mode described with reference to FIGS. 5A-5D. That is, referring to Equation 2, when the difference between the exposure target value and the exposure feature value is less than a predetermined brightness difference M, a significant amount of time may be expended to perform auto exposure.

As an example, when the difference between the exposure target value and the exposure feature value is less than the predetermined brightness difference M, the exposure target value adjusting unit 103 may adjust the exposure target value according to Equation 3 below.

[Equation 3]

if (Sum_$H(a_1$:max)>$T3$)

$$TV'=Min(TV, AE)-TV\_STEP' \quad \text{expression (5)}$$

if (Sum_$H(a_2$:max)<$T4$)

$$TV'=MAX(TV, AE)+TV\_STEP' \quad \text{expression (6)}$$

Here, the TV_STEP' indicates a value greater than the TV_STEP of Equation 2. Also, expression (5) is used to readjust an exposure target value to reduce exposure of an input image and expression (6) is used to readjust an exposure target value to increase exposure of an input image. That is, when the difference between the exposure feature value and the exposure target value is less than the predetermined brightness difference M, the exposure target value adjusting unit 103 may readjust the exposure target value according to an adjustment value larger than an adjustment value with respect to the exposure target value of the general correction mode of FIG. 5.

Figure 7:
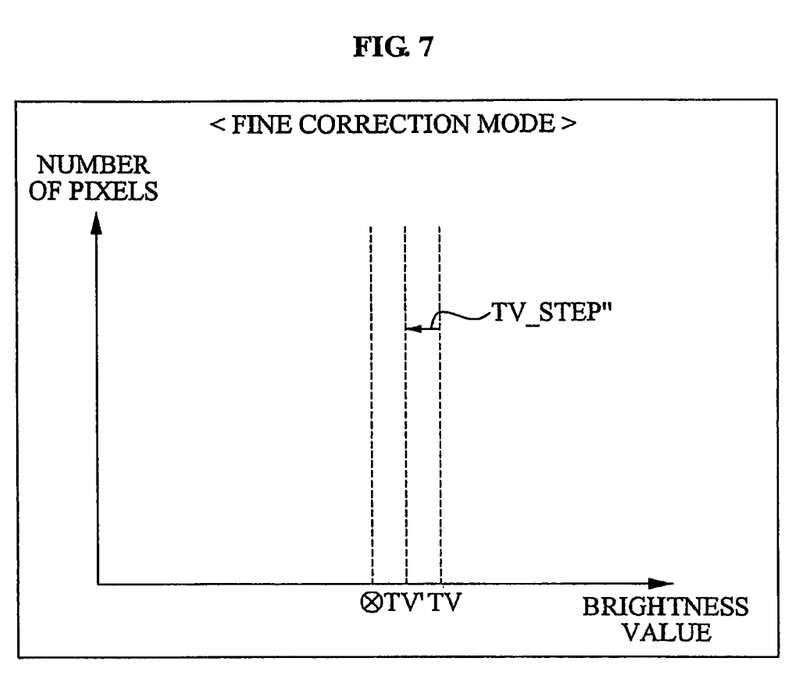
FIG. 7 illustrates readjusting of an exposure target value (fine correction mode), when an exposure target value is near a proper exposure target value according to an example embodiment.

FIG. 7 illustrates readjusting of an exposure target value (fine correction mode) when an exposure target value is near a proper exposure target value according to an example embodiment.

Referring to FIG. 7, a brightness histogram indicates a case when the TV is near the proper exposure target value ($\bar{x}$) of an input image. When the TV is near the proper exposure target value ($\bar{x}$) of an input image in the brightness histogram, the exposure target value adjusting unit 103 may readjust the exposure target value according to Equation 4 based on a fine correction mode.

[Equation 4]

$$TV'=TV-TV\_STEP'' \quad \text{expression (7)}$$

$$TV'=TV+TV\_STEP'' \quad \text{expression (8)}$$

Here, expression (7) is used to readjust an exposure target value to reduce exposure of an input image, and expression (8) is used to readjust an exposure target value to increase exposure of the input image. Also, TV_STEP'' may indicate an adjustment value smaller than an adjustment value with respect to the exposure target value. That is, when the exposure target value (TV) is readjusted to be near the proper exposure target ($\bar{x}$), the exposure target value adjusting unit 103 may readjust the exposure target value according to the adjustment value (TV_STEP'') in a fine correction mode smaller than the adjustment value (TV_STEP) in a general correction mode.

Figure 8A:
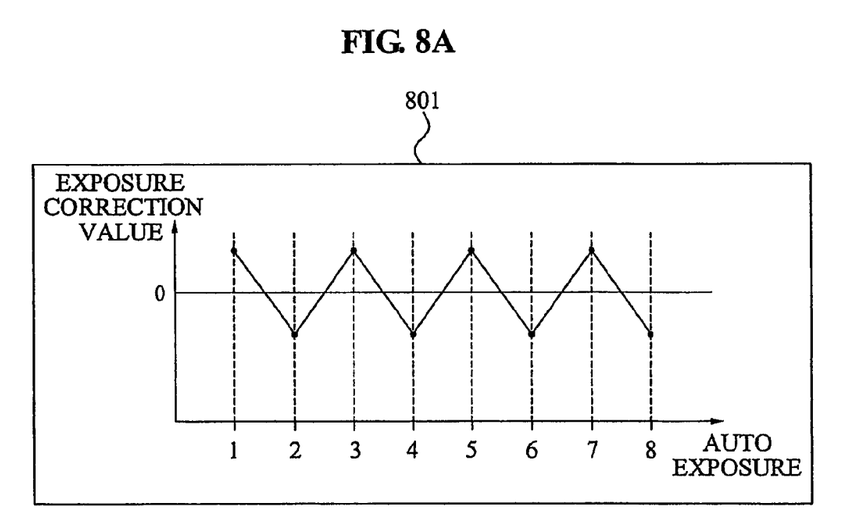
FIG. 8A is a graph illustrating converting of a setting mode which readjusts an exposure target value, when an exposure correction value is oscillating according to an example embodiment.
Figure 8B:
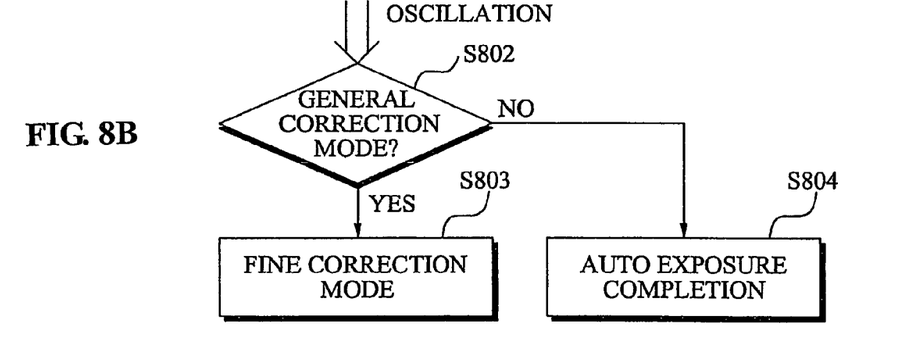
FIG. 8B is a flowchart illustrating the method corresponding to FIG. 8A.

FIGS. 8A and 8B illustrate converting of a setting mode which readjusts an exposure target value, when an exposure correction value is oscillating according to an example embodiment.

As illustrated in the graph of FIG. 8A, changes of the exposure correction value according to how many times auto exposure is performed. When auto exposure of an input image is performed, the oscillation determination unit 105 may determine whether oscillation of the exposure correction value occurs, according to changes of the exposure correction value.

Referring to FIG. 8A, it is recognized that the exposure correction value alternately has a positive and a negative value according to the number of times that auto exposure is performed. In this instance, the positive exposure correction value indicates increasing of exposure of the input image and the negative exposure correction value indicates decreasing of exposure of the input image. That is, although the exposure correction value may converge to zero, as auto exposure is performed, the reference numeral 801 shows that the exposure correction value is oscillating according to the number of times that auto exposure is performed.

For example, when the exposure correction value is determined as oscillating, the oscillation determination unit 105 may determine whether a setting mode of an exposure target value is a general correction mode (operation S802 of the flowchart of FIG. 8B). When the setting mode of the exposure target value is the general correction mode, the oscillation determination unit 105 may convert the setting mode of the exposure target value to a fine correction mode in operation S803. That is, the oscillation determination unit 105 may readjust the exposure target value according to an adjustment value smaller than an adjustment value of the general correction mode. Also, when the setting mode of the exposure target value is a fine correction mode as opposed to the general correction mode, the oscillation determination unit 105 may complete auto exposure in operation S804. Also, the oscillation determination unit 105 may increase an error range of the exposure target value, thereby preventing the exposure correction value from oscillating.

Figure 9:
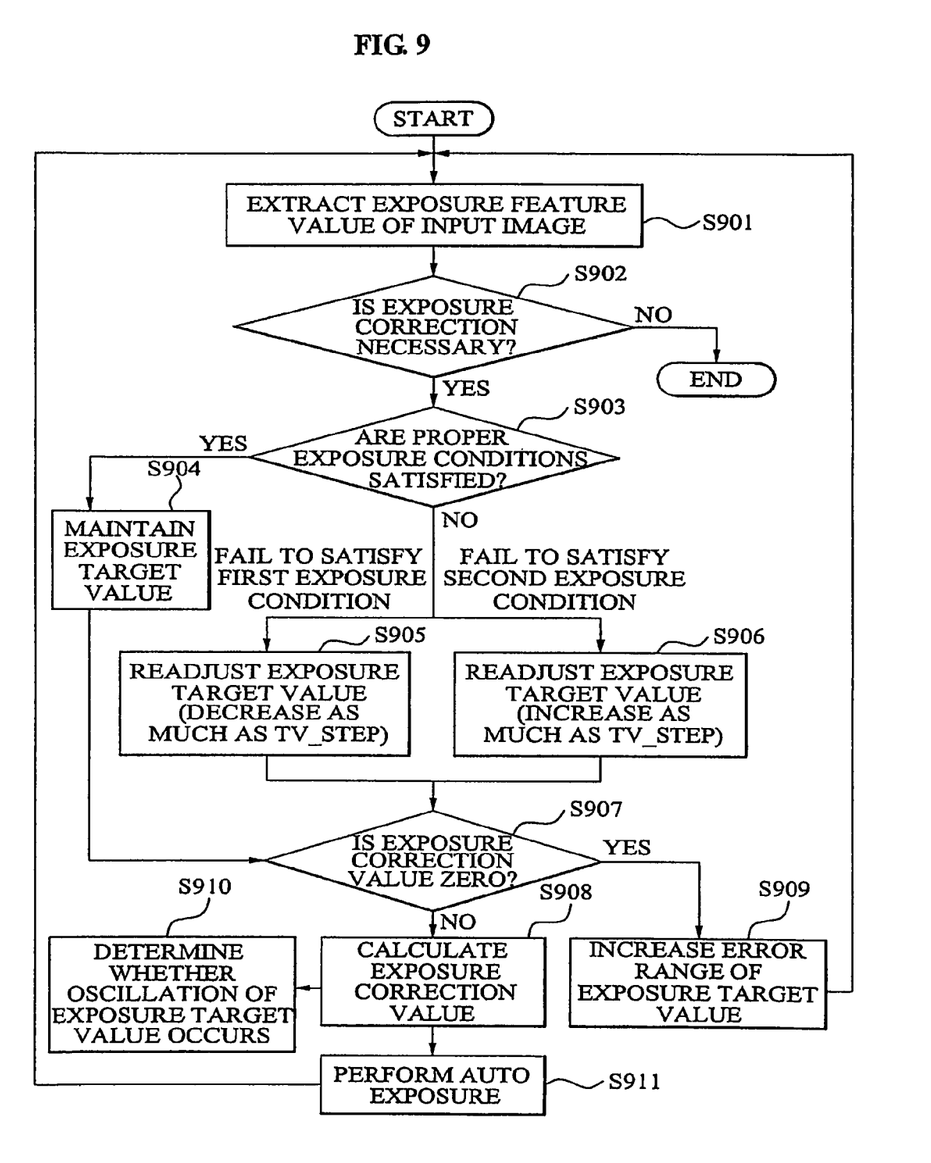
FIG. 9 is a flowchart illustrating an entire process of an auto exposure method according to an example embodiment.

FIG. 9 is a flowchart illustrating an entire process of an auto exposure method according to an example embodiment.

In operation S901, the auto exposure system may extract an exposure feature value of an input image. As an example, the auto exposure system may extract either an average brightness value or an intermediate brightness value of an input image, which is an exposure feature value, using a brightness value of an entire region or a brightness value of a partial region of the input image.

In operation S902, the auto exposure system may determine whether exposure correction with respect to the input image is necessary through comparing the exposure feature value with an exposure target value.

As an example, the auto exposure system may determine whether the exposure correction with respect to the input image is necessary based on whether the exposure feature value is included in an error range of the exposure target value.

In this instance, when the exposure correction is unnecessary, an auto exposure process may be completed. Also, when the exposure correction is necessary, the auto exposure system may determine whether the input image satisfies proper exposure conditions in operation S903. In this instance, the auto exposure system determines whether an upper area distribution of a brightness histogram satisfies the proper exposure conditions including a first exposure condition which determines an overexposure and a second exposure condition which determine an underexposure. The first exposure condition and the second exposure condition are described in Equation 1.

When the upper area distribution of the brightness histogram satisfies both the first exposure condition and the second exposure condition, the auto exposure system may not readjust a present exposure target value and maintain the present exposure target value. Also, when the upper area distribution of the brightness histogram fails to satisfy the first exposure condition, the auto exposure system may readjust the exposure target value according to a general correction mode in operation S905. In this instance, the readjusted exposure target value is a value that is decreased as much as TV_STEP from a smaller value from among the exposure feature value or exposure target value.

Also, when the upper area distribution of the brightness histogram fails to satisfy the second exposure condition, the auto exposure system may readjust the exposure target value according to the general correction mode in operation S906. In this instance, the readjusted exposure target value is a value that is increased as much as TV_STEP from a greater value from among the exposure feature value or exposure target value.

As an example, in operation S905 and S906, when a difference between the exposure target value and the exposure feature value is less than a predetermined brightness difference, the auto exposure system may readjust the exposure target value according to an adjustment value larger than an adjustment value of the general correction mode.

As an example, in operation S905 or S906, when the exposure target value is near to the proper exposure target value of the input image, the auto exposure system may readjust the exposure target value according to a fine correction mode. In this instance, the auto exposure system may readjust the exposure target value according to an adjustment value of the fine correction mode smaller than the adjustment value of the general correction mode.

When the exposure target value is determined through operations S904, S905, and 906, since the difference between the exposure feature value and exposure target value exists, the auto exposure system may determine whether the exposure correction value is zero in operation S907. In the above example, it is assumed that the exposure correction value is zero. However, according to an example embodiment, it is also possible that the exposure correction value is a predetermined extremely small value.

When the exposure correction value is not zero, the auto exposure system may calculate the exposure correction value in operation S908 and perform auto exposure according to the exposure correction value in operation S911. In this instance, the exposure correction value may be determined as a ratio of the exposure target value to the exposure feature value. Also, the auto exposure system may perform auto exposure through adjusting various settings of an image device (e.g., sensitivity (ISO), shutter speed (exposure time), and iris in the case of camera) according to the exposure correction value.

Also, when the exposure correction value is zero, the auto exposure system may complete the auto exposure process and increase the error range of the exposure target value in operation S909. That is, the auto exposure system increases the error range of the exposure target value, and thus, the auto exposure system may not excessively react to a slight exposure change. When operations S909 and S911 are completed, the auto exposure process may begin again from operation S901.

Also, in operation S910, the auto exposure system may determine whether oscillation of the exposure correction value occurs according to changes of the exposure correction value. That is, the auto exposure system may determine whether the exposure correction value is oscillating as opposed to converting to zero, according to a number of times that auto exposure is performed.

When the exposure correction value is oscillating and the setting mode of the exposure target value is a general correction mode, the auto exposure system may readjust the exposure target value through converting the general correction mode to the fine correction mode. Also, when the exposure correction value is oscillating and the setting mode of the exposure target value is the fine correction mode, the auto exposure system completes the auto exposure and increases the error range of the exposure target value as illustrated in operation S909.

When the auto exposure is completed, exposure information of the input image may be easily inferred from a finally determined exposure target value. In a general exposure condition in which a dynamic range is evenly distributed as illustrated in the histogram of FIG. 4A, the finally determined exposure target value is located in a center area of the dynamic range. However, when the exposure condition is determined as being a high contrast exposure or including highlight as illustrated in the histogram of FIG. 4B, the finally determined exposure target value is determined to be smaller than that of the general exposure condition according to Equation 3. Conversely, when the condition is determined as being a low illumination or being a low contrast exposure, the finally determined exposure target value is determined to be greater than that of the general exposure condition according to Equation 4.

Accordingly, an exposure condition or exposure degree of the present input image may be inferred through referring to the finally determined exposure target value without calculating or equipping an additional device. For example, when the exposure target value corresponds to a center area of the dynamic range (the area having a brightness value of around 128 in the case of an eight bit image), the condition is determined as normal exposure and when the exposure target value is significantly smaller than the center area, the condition is determined as significantly high contrast. Also, when the exposure target value is a little smaller than the center area, the condition is determined as slightly high contrast and when the exposure target value is greater than the center area, the condition is determined as low contrast. The exposure information relatively easily obtained from the exposure target value through the auto exposure process may be provided to an additional operation which requires the exposure information as useful information, since the exposure information may be used as a reference during other image processing.

The auto exposure method according to the above-described example embodiments may be recorded as computer-readable code/instructions in/on a computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

According to an example embodiment, there may be provided an auto exposure system and method that may check whether an exposure target value satisfies proper exposure conditions through a brightness feature value of an input image before performing exposure correction, and thereby may maximally utilize a dynamic range of an image device and prevent saturation of an image.

According to an example embodiment, there may be also provided an auto exposure system and method that may increase an adjustment value with respect to an exposure target value based on a difference between an exposure feature value and exposure target value, and thereby effectively perform auto exposure.

According to an example embodiment, there may be also provided an auto exposure system and method that may finely adjust an exposure target value based on a difference between a proper exposure target value and an adjusted exposure target value, and thereby finely perform auto exposure.

According to an example embodiment, there may be also provided an auto exposure system and method that may control auto exposure through determining whether oscillation of the exposure correction value occurs according to an exposure feature value and exposure target value.

According to an example embodiment, present exposure information is easily obtained using a final exposure target value based on when an auto exposure is completed, and thus, the exposure information of an input image may be easily utilized in another image processing.

What is claimed is:

1. A system for auto exposure, the system comprising:
an exposure feature value extractor to extract an exposure feature value using a brightness value of an input image;
an exposure correction determination unit to determine whether an exposure correction with respect to the input image is necessary by comparing the exposure feature value with an exposure target value;
an exposure target value adjusting unit to adjust the exposure target value based on the brightness value of the input image according to a general correction mode or a fine correction mode, when the exposure correction is necessary; and
an auto exposure unit to calculate an exposure correction value of the exposure feature value based on the adjusted exposure target value, and to perform auto exposure according to the exposure correction value.

2. The system of claim 1, wherein the exposure feature value extractor extracts either an average brightness value or intermediate brightness value of the input image, which is the exposure feature value, using a brightness value of an entire region or a brightness value of a partial region of the input image.

3. The system of claim 1, wherein the exposure correction determination unit determines whether exposure correction with respect to the input image is necessary based on whether the exposure feature value is in an error range of the exposure target value.

4. The system of claim 1, wherein the exposure target value adjusting unit comprises:
a proper exposure condition determination unit to determine whether an upper area distribution of a brightness histogram with respect to the input image satisfies proper exposure conditions including a first exposure condition which determines an overexposure and a second exposure condition which determines an underexposure; and
an exposure target value readjustment unit to readjust the exposure target value based on a result of the determining whether the upper area distribution of a brightness histogram with respect to the input image satisfies the proper exposure conditions.

5. The system of claim 4, wherein the exposure target value readjustment unit
maintains the exposure target value when the upper area distribution satisfies the first exposure condition and the second exposure condition,
readjusts the exposure target value to a new exposure target value, the new exposure target value being less than the exposure target value according to an adjustment value, based on the general correction mode, when the upper area distribution fails to satisfy the first exposure condition, and
readjusts the exposure target value to a new exposure target value, the new target value being greater than the exposure target value according to the adjustment value, based on the general correction mode, when the upper area distribution fails to satisfy the second exposure condition.

6. The system of claim 5, wherein the exposure target value readjustment unit readjusts the exposure target value to the new exposure target value according to a large adjustment value larger than the adjustment value, when a difference between the exposure target value and the exposure feature value is smaller than a predetermined brightness difference.

7. The system of claim 5, wherein the exposure target value readjustment unit readjusts the exposure target value to the new exposure target value according to a small adjustment value smaller than the adjustment value, based on the fine correction mode, when the exposure target value is within a predetermined difference from a proper exposure target value of the input image.

8. The system of claim 1, wherein the auto exposure unit performs auto exposure of the input image using an exposure correction value according to a ratio of the exposure target value to the exposure feature value, when there is a difference between the adjusted exposure target value and the exposure feature value, and
  completes the auto exposure of the input image and increases an error range of the exposure target value, when there is no difference between the adjusted exposure target value and the exposure feature value.

9. The system of claim 1, further comprising:
  an oscillation determination unit to determine whether oscillation of the exposure correction value occurs according to changes of the exposure correction value, when the auto exposure of the input image is performed.

10. The system of claim 9, wherein the oscillation determination unit readjusts the exposure target value by converting a setting mode from a general correction mode to a fine correction mode, when the exposure correction value is determined as oscillating and the setting mode is a general correction mode, and
  completes auto exposure of the input image and increases an error range of the exposure target value, when the exposure correction value is determined as oscillating and the setting mode is the fine correction mode.

11. A method for auto exposure, the method comprising:
  extracting an exposure feature value of an input image using a brightness value of the input image;
  determining whether exposure correction with respect to the input image is necessary comprising comparing the exposure feature value with an exposure target value;
  adjusting the exposure target value based on the brightness value of the input image according to a general correction mode or a fine correction mode, when the exposure correction is necessary; and
  calculating an exposure correction value of the exposure feature value based on the adjusted exposure target value and performing auto exposure according to the exposure correction value.

12. The method of claim 11, wherein the determining of whether the exposure correction is necessary comprises determining whether the exposure correction with respect to the input image is necessary based on whether the exposure feature value is in an error range of the exposure target value.

13. The method of claim 11, wherein the adjusting of the exposure target value comprises:
  determining whether an upper area distribution of a brightness histogram with respect to the input image satisfies proper exposure conditions including a first exposure condition which determines an overexposure and a second exposure condition which determines an underexposure; and
  readjusting the exposure target value based on a result of the determining whether the upper area satisfies proper exposure conditions.

14. The method of claim 13, wherein the readjusting of the exposure target value comprises:
  maintaining the exposure target value, when the upper area distribution satisfies the first exposure condition and the second exposure condition;
  readjusting the exposure target value to a new exposure target value, comprising decreasing the exposure target value by an adjustment value, based on the general correction mode, when the upper area distribution fails to satisfy the first exposure condition; and
  readjusting the exposure target value to a new exposure target value, comprising increasing the exposure target value by the adjustment value, based on the general correction mode, when the upper area distribution fails to satisfy the second exposure condition.

15. The method of claim 14, wherein the readjusting of the exposure target value further comprises readjusting the exposure target value to the new exposure target value according to a large adjusting value that is greater than the adjustment value, when a difference between the exposure target value and the exposure feature value is smaller than a predetermined brightness difference.

16. The method of claim 14, wherein the readjusting of the exposure target value further comprises readjusting the exposure target value to the new exposure target value according to a small adjusting value that is less than the adjustment value, based on the fine correction mode, when the exposure target value is within a predetermined range of a proper exposure target value of the input image.

17. The method of claim 11, wherein the performing of the auto exposure comprises:
  performing auto exposure of the input image using an exposure correction value according to a ratio of the exposure target value to the exposure feature value, when there is a difference between the adjusted exposure target value and the exposure feature value; and
  completing the auto exposure of the input image and increasing an error range of the exposure target value, when there is no difference between the adjusted exposure target value and the exposure feature value.

18. The method of claim 11, further comprising:
  determining whether oscillation of the exposure correction value occurs according to changes of the exposure correction value, when the auto exposure of the input image is performed.

19. The method of claim 18, wherein the determining of the oscillation comprises:
  readjusting the exposure target value comprising converting a setting mode from the general correction mode to the fine correction mode, when the exposure correction value is determined as oscillating and the setting mode is the general correction mode; and
  completing auto exposure of the input image and increasing an error range of the exposure target value, when the exposure correction value is determined as oscillating and the setting mode is the fine correction mode.

20. A non-transitory computer readable medium storing computer readable instructions that control at least one processor to implement the method of claim 11.

* * * * *